(12) United States Patent
Bahrami et al.

(10) Patent No.: US 7,970,786 B2
(45) Date of Patent: Jun. 28, 2011

(54) METHODS AND SYSTEMS FOR CONTEXT BASED QUERY FORMULATION AND INFORMATION RETRIEVAL

(75) Inventors: Ali Bahrami, Sammamish, WA (US); Jun Yuan, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 440 days.

(21) Appl. No.: 11/762,214

(22) Filed: Jun. 13, 2007

(65) Prior Publication Data

US 2008/0313162 A1    Dec. 18, 2008

(51) Int. Cl.
   *G06F 17/30*    (2006.01)
   *G06F 17/00*    (2006.01)

(52) U.S. Cl. .......... 707/779; 707/780; 715/234

(58) Field of Classification Search .......... 707/4, 5, 707/3, 1, 779, 780; 705/10, 9; 709/217; 715/234

See application file for complete search history.

(56) References Cited

U.S. PATENT DOCUMENTS

| | | | |
|---|---|---|---|
| 7,062,507 B2 | 6/2006 | Wang et al. | |
| 2004/0068514 A1* | 4/2004 | Chundi et al. | 707/102 |
| 2004/0078777 A1 | 4/2004 | Bahrami | |
| 2004/0167864 A1 | 8/2004 | Wang et al. | |
| 2004/0225555 A1* | 11/2004 | Persidis et al. | 705/10 |
| 2004/0267730 A1* | 12/2004 | Dumais et al. | 707/3 |
| 2005/0027585 A1* | 2/2005 | Wodtke et al. | 705/9 |
| 2005/0204333 A1 | 9/2005 | Denby et al. | |
| 2005/0228711 A1* | 10/2005 | Lahey et al. | 705/9 |
| 2006/0288330 A1 | 12/2006 | Bahrami et al. | |
| 2007/0022107 A1* | 1/2007 | Yuan et al. | 707/4 |
| 2007/0100790 A1* | 5/2007 | Cheyer et al. | 707/1 |
| 2008/0034055 A1* | 2/2008 | Das et al. | 709/217 |
| 2008/0201300 A1* | 8/2008 | Goodwin et al. | 707/3 |
| 2008/0313162 A1* | 12/2008 | Bahrami et al. | 707/4 |
| 2009/0222400 A1* | 9/2009 | Kupershmidt et al. | 706/52 |

* cited by examiner

*Primary Examiner* — Mohammad Ali
*Assistant Examiner* — Bao G Tran
(74) *Attorney, Agent, or Firm* — Armstrong Teasdale LLP

(57) ABSTRACT

A system for retrieval and aggregation of information resulting from context-based queries includes one or more programmed worklets and a plurality of interconnected computer systems. The computer systems are collectively programmed to model the workflow activities worklets distinct from assistlets to recognize work people perform and to suitably represent such work, generate queries through a meta-querying template that utilize the modeled worklets received from a first processing unit, retrieve information relevant to the work task in response to the queries from a plurality of data sources, and aggregate the retrieved information for presentation to the user.

12 Claims, 4 Drawing Sheets

US 7,970,786 B2

METHODS AND SYSTEMS FOR CONTEXT BASED QUERY FORMULATION AND INFORMATION RETRIEVAL

BACKGROUND OF THE INVENTION

This invention relates generally to information retrieval, and more specifically, to context-based query formulation and information retrieval relating to user workflow and the tasks defined within the workflow.

Workers are increasingly challenged with the issues of information overload and correlation of information from heterogeneous sources. Different users have varying roles, tasks, missions, goals and agendas, knowledge and background, and personal preferences. As such, these different users typically need different pieces of the available information, ranging from real time information relating to a current task to, for example, an overall resolution strategy for a project that might be global in nature. Sometimes, the time, the location, and the past history related to information access can shape the information needs of users, for example, in regards to the execution of user queries and the form in which retrieved information is packaged.

Full automation of such an information aggregation and customization task as described above is not possible with existing approaches.

BRIEF DESCRIPTION OF THE INVENTION

In one aspect a method for context-based query formulation and information retrieval and aggregation is provided. The method includes modeling one or more workflow activities utilized to perform work tasks, preparing at least one meta-querying template, to generate queries that utilize the modeled workflow activities, retrieving information relevant to the work task as determined utilizing the at least one meta-querying template, and aggregating the retrieved information for presentation to the user.

In another aspect, a system for retrieval and aggregation of information resulting from context-based queries is provided. The system includes a plurality of interconnected computer systems collectively programmed to model one or more workflow activities utilized to perform work tasks, generate queries through a meta-querying template that utilize the modeled workflow activities received from said first processing unit, retrieve information relevant to the work task in response to the queries from a plurality of data sources, and aggregate the retrieved information for presentation to the user.

In still another aspect, a method for developing context-based queries and using the queries for information retrieval and aggregation is provided. The method includes providing workflow activities for a user, a profile for the user, and any semantic data related to the user to a process modeler, generating a request for relevant information, relevance based on one or more modeled processes and a query template, and receiving and aggregating the relevant information for presentation to the user.

The features, functions, and advantages that have been discussed con be achieved independently in various embodiments of the present invention or may be combined in yet other embodiments further details of which can be seen with reference to the following description and drawings.

DETAILED DESCRIPTION OF THE INVENTION

The embodiments described herein present an infrastructure that provides each information consumer and producer with a customized, mission-oriented, knowledge system that provides access to relevant information, integrated from multiple sources, in the context of work and mission while contributing to the building and sharing of collective information space and knowledge. The quality of information provided to the information consumer is improved because the desired information is collected from available information sources in a context related to the work, task, or mission to be performed through generic mechanisms that respond to changes in information content and evolutions in usage of the information, by both consumers and producers of the information.

Different collaborators contributing to the collective information space and knowledge often bring different contexts to their information which is attributed by their rationale, situation awareness, understanding, experience and resource availability and the constraints attached with them.

Figure 1:
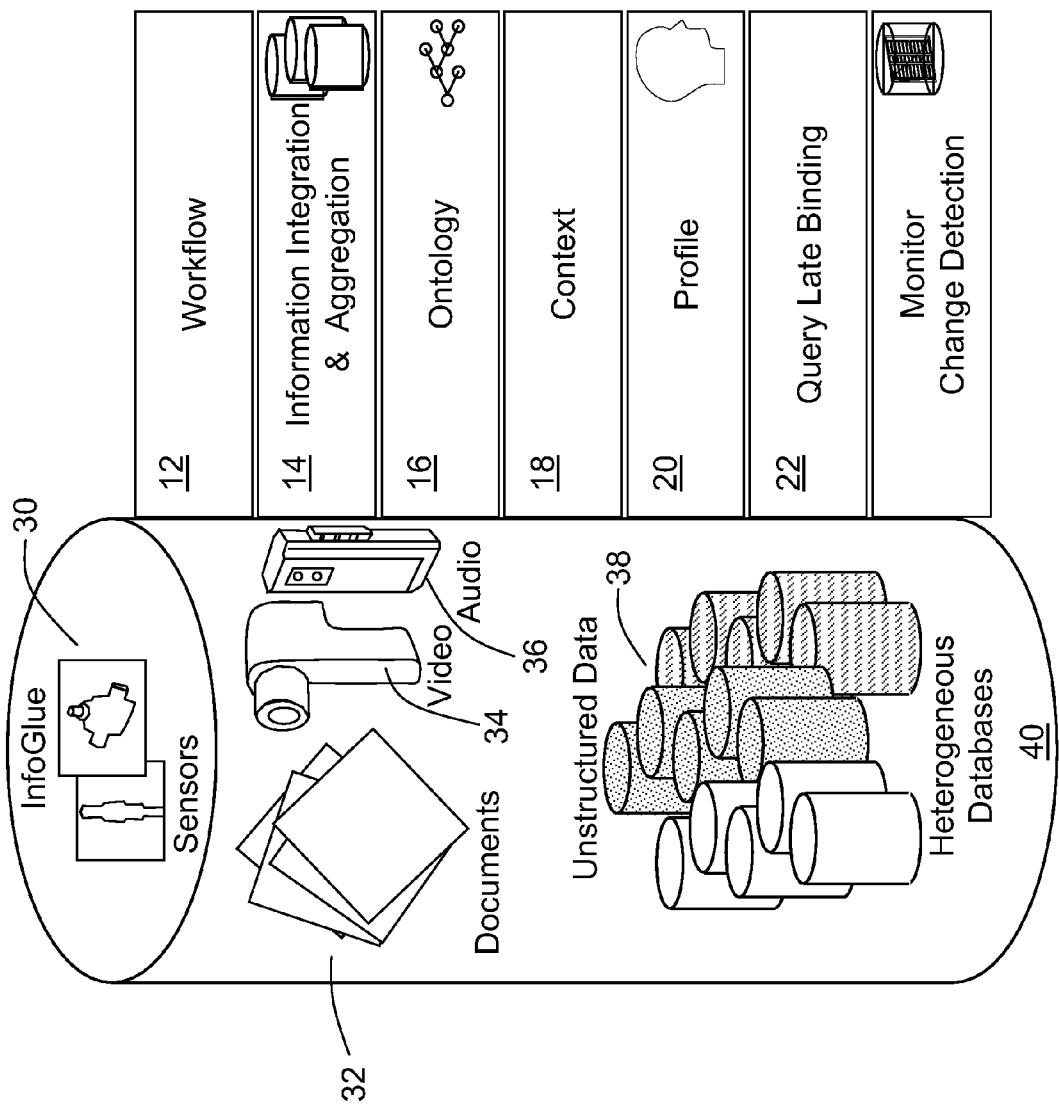
FIG. 1 is a diagram illustrating an approach to context-based query formulation and information retrieval and aggregation based on six intertwined and fundamental concepts.

As illustrated by FIG. 1, one embodiment of the building and sharing of collective information space and knowledge mentioned above, utilizes an approach based on six intertwined and fundamental concepts. The six concepts include, workflow 12, information integration and aggregation 14, ontology 16, context 18, profile 20, and query/binding 22 each of which is further described herein. Collectively, these six concepts provide a mechanism for getting relevant information to an information user. The exploitation of such knowledge, using appropriate domain ontologies, makes it feasible to provide contextual assistance to improve user-specific work, overall goals, and preferences. By providing contextual-based information to information users, a competitive advantage likely results for the organization. As an example, an ability to reduce information overload received by users working on tasks results in an increased efficiency as extraneous information, unrelated to, or marginally related to, the users tasks will not have to be reviewed by the users. In other words, by improving the quality of information provided to users, for example, with the right information available from information sources in context of the plan, work, task or mission to be performed, efficiencies result.

To reduce information overload, information retrieval is adaptable through utilization of user workflows, or worklets, a context, and a profile that provides a late binding query based on real-time execution of workflow and external events. Ontologies that explicitly represent semantics of the domain are utilized to provide clear and unambiguous understanding to different parties in an information framework are incorporated.

When the six concepts mentioned above are combined with available information, such as sensor data 30, document data 32, video data 34, audio data 36, unstructured data 38, and other heterogeneous databases 40 (all labeled as InfoGlue in FIG. 1), a computer-based infrastructure is created through which a user is able to receive customized work and mission oriented knowledge. Specifically, the user has access to the right information from multiple sources in the context of the work and mission, while also contributing to the building and sharing of the collective knowledge.

While at least a portion of such information is stored in multiple heterogeneous computer systems, that include therein databases 40, information integration capability is therefore an enabler for the herein described infrastructure. In the past few years, several commercial-off-the-shelf (COTS) enterprise information integration (EII) products have been developed for integrating existing data systems. Such products provide an important capability, namely, answering queries against a variety of information sources across the networks with a single unified query interface. These products are a great help in resolving non-semantic heterogeneity including platform heterogeneity, network heterogeneity, data model heterogeneity, and more importantly, query capability heterogeneity. However, it is believed that the COTS EII products that are available are limited in the capabilities of adequate semantic interoperability.

To extend the existing capability of semantic information integration, the disclosed embodiments address personalized and process-driven semantic information aggregation issues. Examples of such issues are summarized in the following sentences. One such issue is how to formulate user information needs, for example, to retrieve relevant information based on the task user is trying to achieve. Another semantic information aggregation issue is how to characterize information, for example, optimization of information retrieval and aggregation mechanisms against a contextual backdrop that includes the user's task, goals, knowledge and information requirements, in order to improve the relevance of query results and reduce information overload. Another semantic information aggregation issue is how to identify the information sources best able to meet user needs, such as which information will be easiest for the user to understand and use. A further semantic information aggregation issue is how to adjust information retrievals in response to changes in the users information needs, an example of which is an ability to adapt query formulation based on changes in tasks being performed by the users.

Certain embodiments utilize worklet modeling, as described in U.S. Patent Application Publication US 2006/0288330 A1, which is hereby incorporated by reference, to develop principles on modeling for information and processes. Worklets are states or phases of work performed by "agents" (Assistlets) on behalf of people or system. Such worklets provide a new and innovative framework to model and orchestrate information systems while allowing for design time flexibility and runtime adaptability. Therefore worklet modeling results in a more flexible and adaptable approach for orchestrating web services by utilizing assistlets, rule based engine, and event driven workflow.

Work is a physical or mental effort or activity directed toward the production or accomplishment of something. Alternatively, work as a noun is defined as something that has been produced or accomplished through the effort, activity, or agency of a person or thing. A method, processor, and computer program directed at recharging data caches in mobile devices, the mobile devices being directed at facilitating work or the production of work, advantageously exploits accomplishment of phases of work as a metric for determining a priority for communication a data segment. Again, such phases of work are described as worklets.

Because a worklet is a phase of work performed by people in interaction with a computing device, people achieve worklets without modeling the worklets. Modeling the worklets allows for recognition of the work people perform in order to suitably represent that work. Important in the understanding of the definition of worklets is that they are defined to conform to the achievement of work by a person rather than to define the work according to a manner that is most expeditious for the computing device. Thus, as a person performs work, observation of the phase of work the person performs suitably defines the worklets that taken together represent the person's performance of work. Allowing software with access to worklet definitions to reside and execute in an abstract layer as the person directs the processor to perform work, the software can, by comparison to the work performed to worklet definition, catalogue all of the work performed and place that catalogue in association with an identity of the user to form a user profile.

Suitably selecting a modeling framework based upon a language configured to express phases of work and the transitions may force the separation of work practices from work processes. Worklet recognition scripts distinct from assistlets are defined in an abstract layer to reside on top of work processes. Therefore, the worklet model can be associated to the processor-specific assistlets that, in turn, represent the detail steps of worklet executions. Worklet recognition occurring in the abstract layer collectively forms the generation of a user profile and worklet modeling.

A worklet as programmed in a modeling language is an object configured to quantify relevant work that people accomplish. The worklet is associated with what tools people use to accomplish the work, the input data, and the artifacts or output data the people using the computing device create. The definition of any worklet is based upon the phase of work described and is independent of underlining work processes used to accomplish that phase of work. A worklet object includes a boundary or a boundary condition and which is associated with a transition object. The transition object includes a decision gate admitting the accomplishment of the phase of work within the boundary and when the boundary condition is satisfied, allows the process to commence the next worklet or phase of work. Otherwise, where the boundary condition is not met, the process will continue work in the current phase or worklet.

The underlying work processes used to accomplish that phase of work include, but are not limited to, assistlets associated with the phase of work or worklet. An assistlet is an executable program component that is tightly configured to perform a defined task such as "retrieve email," "prepare a new document according to a template," or "save the document." Elements of a work phase are accomplished by assistlets, the assistlets being configured to perform repeatable subdivisions of the work phase. Assistlets are defined to be suitably configured for completion of a defined work phase element.

A practical distinction between worklets and assistlets is that worklets are defined phases of work and are independent of the actual means that cause the phase of work to be accomplished. Assistlets are the individual executable program components that are currently selected to accomplish the worklet. As there may be several distinct and suitable means including the assistlets that will accomplish the phase of work or worklet, programmers typically select a most suitable ordered series of assistlets and associate that most suitable ordered series of assistlets with the worklet to allow accomplishment of the worklet. When a more suitable ordered series of assistlets becomes known or is configured, the programmer associates the new more suitable series of assistlets with the worklet in lieu of the earlier suitable ordered series of assistlets.

Using these principles, a generic framework is developed, sometimes referred to herein as infoglue, to perform context-based query formulation and semantic-based information retrieval through multiple heterogeneous information sources. By enabling access to information from different data sources, by different users, with different needs, a dynamic and complex environment results.

Context based query formulation and semantic-based information retrieval is an approach to leverage knowledge about user preferences, user access history information domains, workflow, and run-time exceptions to enable context aware information retrieval, from heterogeneous data sources. Specifically, in order to manage the scope of the vast possibilities inherent in contextual representation, and to focus such an effort on useful demonstrations of context-influenced mediated information integration, the use of user profiles, process workflow, source availability monitoring, and real time aggregation within a framework of ontological mediation is demonstrated. Additionally, a semantic query mechanism is demonstrated in order to increase the relevance of query results, reduce analysts' information overload, and reduce an overall workload.

As described above, the so called infoglue, or context-based query formulation and semantic-based information retrieval is based on six intertwined fundamental concepts, namely, workflow 12, information integration and aggregation 14, ontology 16, context 18, profile 20, and query late binding 22. Context-based query formulation and semantic-based information retrieval provides a contextual, user centric, mission-oriented knowledge portal where each individual can access relevant information available from information sources in context of the work to be performed. In short, the described system allows arbitrary navigation and semantic connections on any number of sources and products, takes into account user individual interests and group constraints within a dynamic and evolving task context, and allows collaborative work. In addition, it includes a variety of services, such as contextual search, task-oriented toolset, briefing production, configuration and security.

In regard to workflow 12, or more formally, a workflow service layer, a process model provides a more comprehensive picture about the position of both a user and a piece of information in a larger context. In one regard, the process model may tell exactly where and how aggregated information is going to be used. In another regard, the process model may indicate that the aggregated information is going to be shared among other users, in which case it links different user profiles together for the purpose of better personalization.

In regard to the information integration and aggregation service layer 14, query formulation and information retrieval utilizes input from multiple information sources, in which there may be a combination of structured, semi-structured, and unstructured data. These information resources are inherently heterogeneous and extremely large. Existing technologies such as data warehousing have provided solutions to some extent. However, because of issues such as sheer scale and volume of data, the extremely large number of participating systems, the variety of data sources and formats, and more importantly lack of necessary semantic understandability, existing approaches are costly and inefficient on maintaining data consistency.

In regard to the ontology service layer 16, a main role of the ontology component of query formulation and information retrieval is to enable enhanced knowledge management services, such as semantic search, text mining, document classification, all exploiting the ontology model and other ontology-based automated reasoning. The exploitation of such knowledge, using appropriate domain ontologies, makes it feasible to provide contextual assistance in various ways to the work performed according to workflow, and accordingly to user/group preferences. The exploitation of the knowledge content, structure and their meanings, using appropriate domain ontologies, also makes it feasible to provide contextual assistance, in various ways, to the work performed within portfolios, and accordingly to user/group preferences.

In regard to the context service layer 18, research on context-related topics is given increased attention with the establishment of international and interdisciplinary communities where interoperability and mobility must rely on context awareness for situated computing, and from the decision support system and artificial intelligence communities. In context-aware applications, the context information is usually limited to parameters such as localization and time, and most of the user's dimension such as user workflow is ignored.

In regard to the profile service layer 20, a user profile is one piece of ontology that describes the user's characteristics in regards to information consumption. Some of the characteristics are relatively static, such as a user's interests, skills, preferences, and security classification, but many others may be highly dynamic, for example, available devices, network bandwidth, and current locations. The user characteristics may vary quite differently in various circumstances. To accommodate changes in user characteristics, an information aggregation request can then be adjusted according to the basic characteristics captured in a user profile.

Context-based query formulation and semantic-based information retrieval, in one aspect, provides a relatively generic plug-in framework where system or user-defined adaptation mechanisms can be plugged into a framework. First, the whole system and its components specify a set of allowable configurations and parameters for each configuration. The adaptation is achieved by switching configurations and fine tuning configuration parameters in real time without turning down the system. Adaptation mechanisms will take user profile, workflow, context, environment and other information to select a configuration from the given pool and to set the parameters of the configuration according to the current states. In other words, the adaptation component couples with the other components only through the configuration settings.

One of the key challenges of a context-based query formulation and semantic-based information retrieval system is the combination of user workflows, profiles, ontologies and other contextual background information together with a user's information retrieval request. During worklet modeling a user can formulate concepts of interests needed to perform that phase of the work. However, and as described above, the objective is to specify semantics about the information retrieval and aggregation not necessarily how information is going to be retrieved. Based on the meta-querying templates, the system generates, at run-time, one or more executable queries that best match users needs based on a worklet specified concept of interest.

In one embodiment, a meta-query template (mqt) approach is utilized, to increase the relevance of query results and to reduce analysts' information overload and overall workload. The meta-query template extends the semantic query definition to accommodate context awareness based on the process models according to: mqt=(o, w, s, p, q, v, a), where o is ontology, w is worklet, s refers to assistlets associated with the worklet, p is a profile, q is a collection of semantic query manipulations, v is a variable which allows a user to go from a query to set of queries, and a is an aggregation which allows a user to go forward from a set of queries to a single one.

These seven elements (o, w, s, p, q, v, a), together define information context. The profile, p, represents information including how the information is used (by referencing the worklet model), who is consuming the information (with what restrictions), and where the information is located as well as whether each data source of interest is available.

Given a particular domain, o is the ontology to describe the basic semantic knowledge that has been captured in various data systems within the domain. q includes a number of semantic query manipulations that explicitly reference the ontology o, for the purpose of deriving advanced knowledge that is utilized to perform various tasks that are defined in w.

At runtime, when a worklet in w is initiated, one or more specific task performers (human or computer agents) are assigned to conduct the work, and thus the corresponding user profiles are attached to the worklet. These profiles usually indicate additional restrictions on the information retrieval process, for instance, different privileges or particular preferences to access multiple data systems. Therefore, the query manipulations in q are customized according to attached profiles in p, for the purpose of either eliminating unauthorized data access or for better source selection. Furthermore, during the execution of a particular worklet, different assistlets may be selected to perform the work. Each assistlet may have its own requirements on information, ranging from a specific syntactic specification to advanced semantic aggregation. Operations such as adding a query concept, adding new navigations, merging query concepts, specializing/generalizing query concepts, attaching/binding query constraints, as well as other operations may be utilized to further customize the information retrieval request. In our approach, these customizations are achieved by adding various variables in v to link multiple semantic query manipulations together.

In general, one embodiment of the meta-query template described above uses a late binding technique that is able to dynamically generate an information aggregation request given the current states of w, s, and p. The query manipulations in q serve as the basic vocabulary for dynamic query rewriting, and they are automatically derived based on the knowledge in w, s, and p. a, then, is the service that helps to generate the final information aggregation request given the set $\{o, w, s, p, q, v\}$.

While the meta-query template may not contain all details of the information retrieval requests, it may include enough details so that the context of the information retrieval requests can be determined at the design time of the worklet model. In one embodiment, the meta-query template references a merged subset of domain ontology. Additional manipulations to the template may be added during the instantiation of the worklet model, based on the profile and context information.

Further query manipulations can be added on during the execution, based on the current state of both workflow and environment. For example, one or more executable query statements may be generated based on one or more of network changes detected in the interconnected computer system, the real-time accessibility of multiple heterogeneous data sources, and users' security access privileges to multiple heterogeneous data sources.

Figure 2:
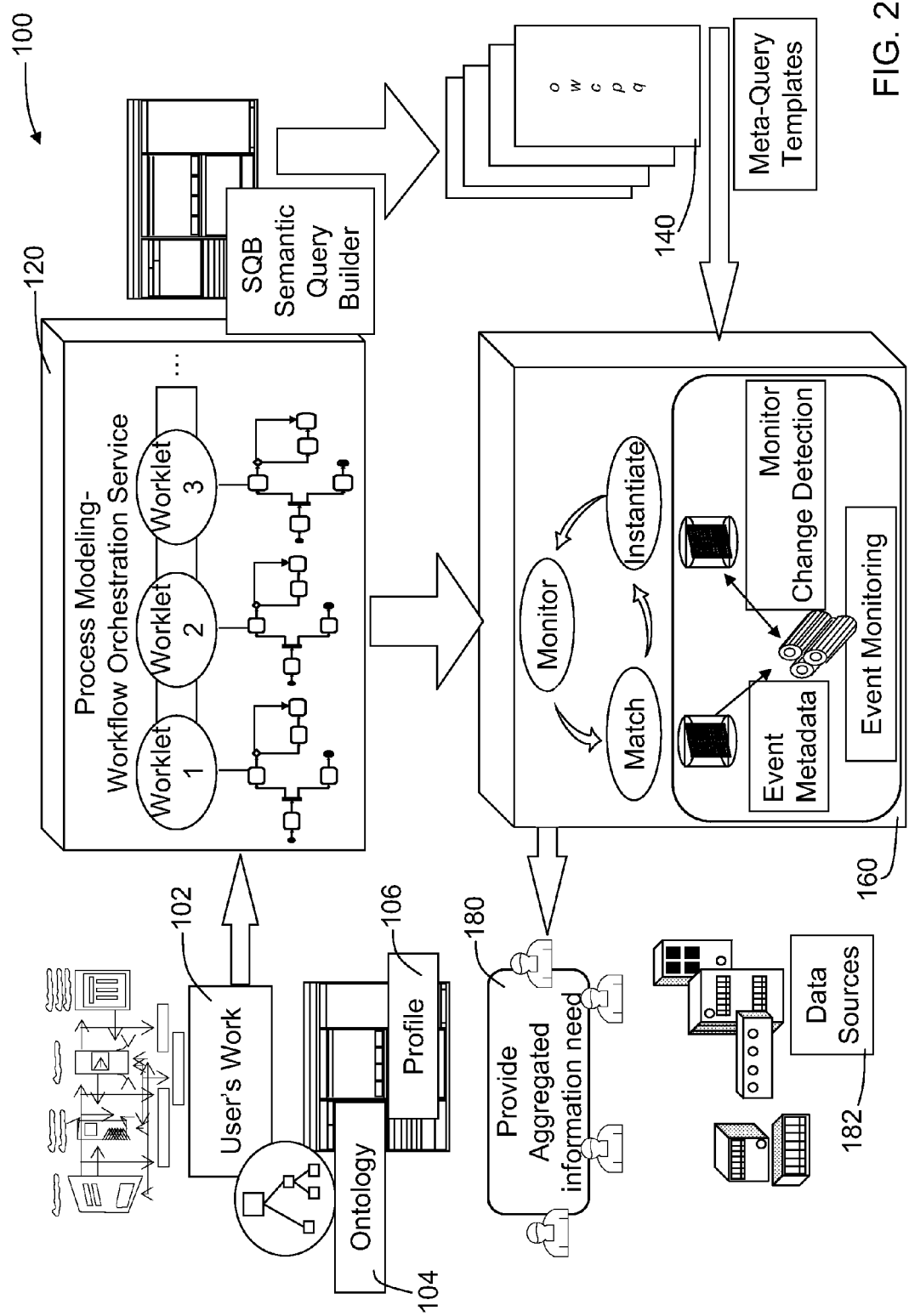
FIG. 2 is a diagram illustrating information flow in a query formulation and information retrieval and aggregation system.

FIG. 2 illustrates one potential information flow in the workflow based information retrieval and aggregation service. Process models 100 represent information about users' workflows 102, ontology 104, and profiles 106, and source availability monitoring provides a mechanism to dynamically configure information requirements with available sources. This dynamic configuration is characterized by the late binding of user queries based on real-time execution of workflow and external events. During process modeling 120 users can formulate concepts of interest needed to perform each phase of their work, supporting information retrieval and aggregation. Meta-query templates 140 are used to configure user requirements. The system 160 selects templates for generating the query that best matches users' needs, based on process specifications of their concepts of interest.

More specifically, during process modeling 120 users specify the conceptual steps needed to perform various phases of the work to be performed, and meta-querying templates 140 are used in the system 160 to represent these requirements. At run time, the system 160 selects the appropriate templates 140 for generating queries that best match users' needs based on specifications of a query orchestration service. System 160 monitors changes in the information environment and dynamically modifies the states of these query manipulations to improve the robustness of system response, which includes the aggregated information 180 from a plurality of data sources.

Figure 3:
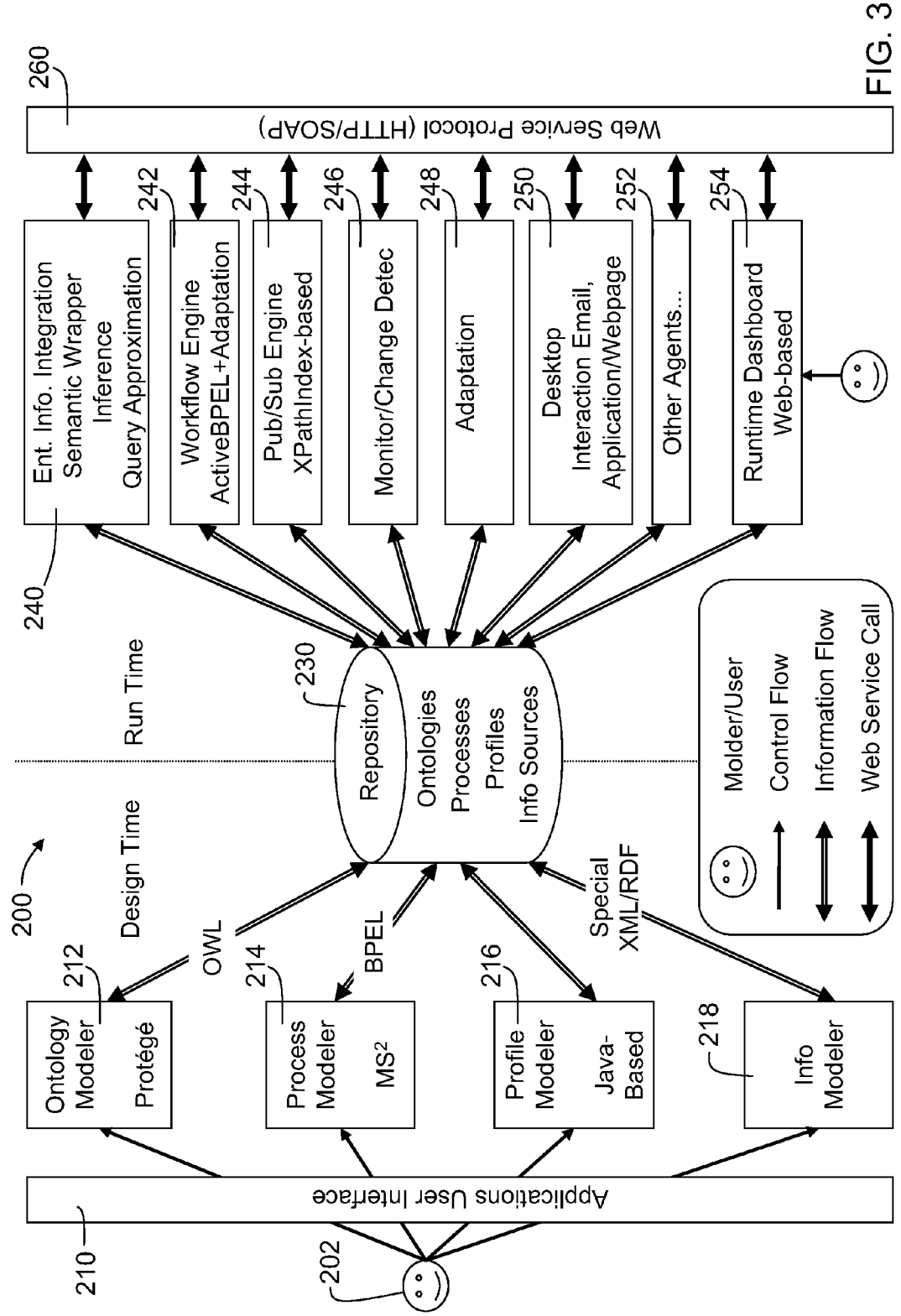
FIG. 3 is an information architecture for a query formulation and information retrieval and aggregation system.

FIG. 3 is an information architecture 200 for a query formulation and information retrieval and aggregation system. Through an applications user interface 210, one or more users 202 are able to generate models, during a design time, that are utilized in information retrieval. Specifically, an ontology modeler 212, a process modeler 214, a profile modeler 216, and an information modeler 218 are shown, all of which provide data to a data repository 230. As a result, data repository 230 includes ontologies, processes, profiles, and information sources.

At run time, the data repository 230 provides modeling information to and receives query results from a number of source applications. A sampling of these source applications includes an information integration application 240, a workflow engine 242, a Pub/Sub engine (define) 244, a monitor/change detection engine 246, an adaptation engine 248, desktop interaction 250, any other agents 252, and a runtime dashboard 254 all of which are implemented in one embodiment as web services utilizing one or more of an HTTP or SOAP protocol 260.

Figure 4:
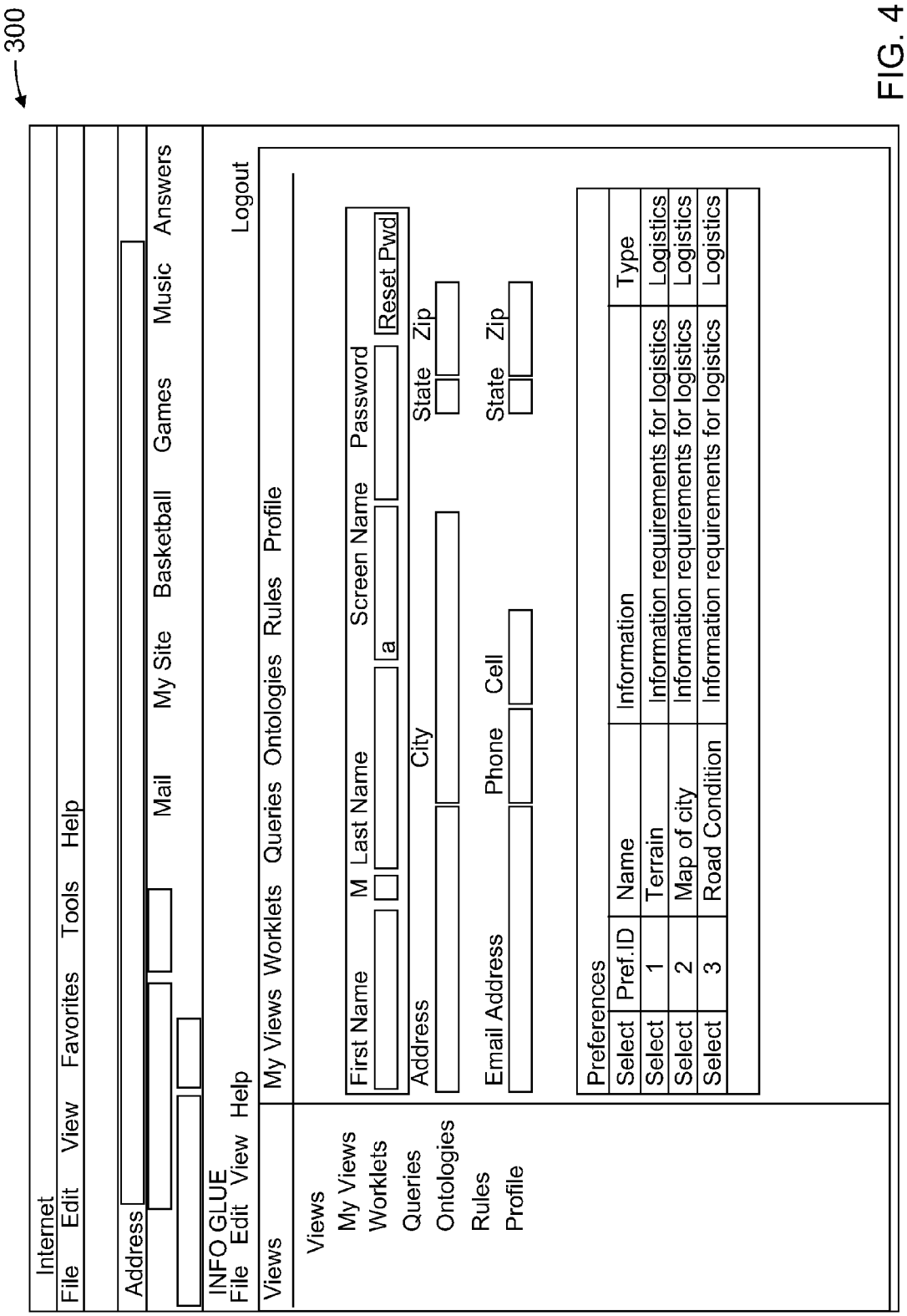
FIG. 4 is an example web interface providing a portal through which a user can view worklets, queries, ontologies, rules, and profiles.

FIG. 4 is an example web interface 300 providing a portal through which a user can view worklets, queries, ontologies, rules, and profiles.

The described computer-based architecture is open and adaptable, supported by the choice of standards-based interfaces between major architectural elements. In one embodiment, the workflow generator interface to the workflow engine is primarily via BPEL4WS (BPEL for Web Services), which is an open W3C standard for specifying workflows. The application components are implemented as web services, which also have interfaces that use standardized mechanisms for their expression and communication such as SOAP, XML and WSDL, and interact with the workflow engine similarly in standards-based ways. This results in an open architecture that facilitates independent evolution of its constituent elements.

While the invention has been described in terms of various specific embodiments, those skilled in the art will recognize that the invention can be practiced with modification within the spirit and scope of the claims.

What is claimed is:

1. A system for retrieval and aggregation of information resulting from automatic context and work aware queries, said system including one or more programmed worklets and further comprising a plurality of interconnected computer systems collectively programmed to:

model said one or more worklets distinct from assistlets to recognize work people perform and to suitably represent said work;

automatically generate context and work-aware queries through a meta-querying template that utilize the modeled worklets received from a first processing unit, the queries further aligned with ontologies, semantic query manipulations, and user profiles, the meta-querying template is defined according to mqt=(o, w, s, p, q, v, a), where o is an ontology describing basic semantic knowledge that has been captured in various data systems, q includes of a number of semantic query manipulations that explicitly reference the ontology o, w is a worklet defining tasks to be performed, s is an executable program component configured to perform a defined task, p is a user profile, v is a variable which allows a transition from a query to set of queries, and a is an aggregation which allows a user to go forward from a set of queries to a single one;

leverage external executable program components to detect and adapt to changes in data sources and increase availability of information;

retrieve information relevant to a work task in response to the queries from a plurality of data sources;

dynamically generate an information aggregation request given the current states of w, s, and p using a binding technique; and adaptively combine and aggregate the retrieved information based on semantic understanding of user needs for presentation to the user.

2. A system according to claim 1 wherein to model one or more said worklets said computer systems are programmed to formulate user information needs based on a task the user is trying to achieve.

3. A system according to claim 1 wherein to generate queries, said computer systems are programmed to:
receive contextual data comprising at least one of tasks, goals, knowledge and information requirements related to a user; and
utilize the contextual data to improve relevance of queries and retrieved information.

4. A system according to claim 1 wherein said computer systems are programmed to identify which information sources are able to provide a user with information relevant to said worklets.

5. A method for operating a computer having an associated data repository for automatic context and work aware query formulation and information retrieval in a heterogeneous computer system environment, said method comprising:
accepting worklet models to be used in information retrieval, said accepting performed via a user interface of the computer;
storing said worklet models in the associated data repository;
providing said worklet models in the associated data repository to a plurality of source applications;
generating one or more context and work-aware executable queries in response to said worklet models in accordance with user needs, the queries further aligned with ontologies, semantic query manipulations, and user profiles by defining the meta-querying template according to mqt= (o, w, s, p, q, v, a), where o is an ontology describing basic semantic knowledge that has been captured in various data systems, q includes of a number of semantic query manipulations that explicitly reference the ontology o, w is a worklet defining tasks to be performed, s is an executable program component configured to perform a defined task, p is a user profile, v is a variable which allows a transition from a query to set of queries, and a is an aggregation which allows a user to go forward from a set of queries to a single one;
receiving results from said executable queries from said plurality of source applications;
adaptively combining and aggregating received query results based on a semantic understanding of user needs;
dynamically generating an information aggregation request given the current states of w, s, and p using a binding technique; and
displaying the combined and aggregated received query results via a user interface.

6. A method in accordance with claim 5 wherein said displaying the combined and aggregated received query results via a user interface comprises displaying said aggregated received query results via a web interface.

7. A method in accordance with claim 5 wherein the plurality of source applications includes at least one member of the set consisting of an information integration application, a workflow engine, a monitor/change detection engine, an adaptation engine, and a runtime dashboard.

8. A method in accordance with claim 7 wherein said at least one member of the set is implemented as a web service utilizing at least one protocol selected from hypertext transfer protocol (HTTP) and simple object access protocol (SOAP).

9. A method in accordance with claim 5 wherein said accepted models include an ontology modeler, a process modeler, a profile modeler, and an information modeler.

10. A method in accordance with claim 9 wherein said generating one or more context and work-aware executable queries comprises generating one or more queries in accordance with a worklet-specified concept of interest.

11. A method in accordance with claim 5 wherein said generating one or more context and work-aware executable queries further comprises utilizing the meta-query template to extend a semantic definition of said one or more queries to accommodate context awareness based on a process model.

12. A method in accordance with claim 11 wherein said generating one or more context and work-aware executable queries further comprises generating one or more queries in accordance with network changes detected in at least one member of the group consisting of the heterogeneous computer environment, real-time accessibility of multiple heterogeneous data sources, and security access privileges to multiple heterogeneous data sources.

* * * * *